M. T. WESTON.
EXPANSION BOLT.
APPLICATION FILED FEB. 5, 1913.
1,212,298.
Patented Jan. 16, 1917.
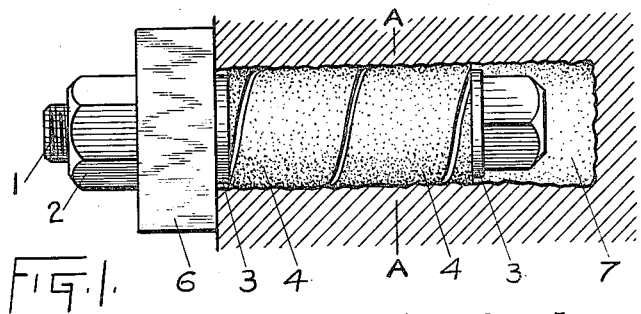
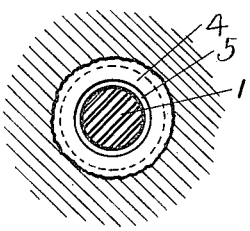
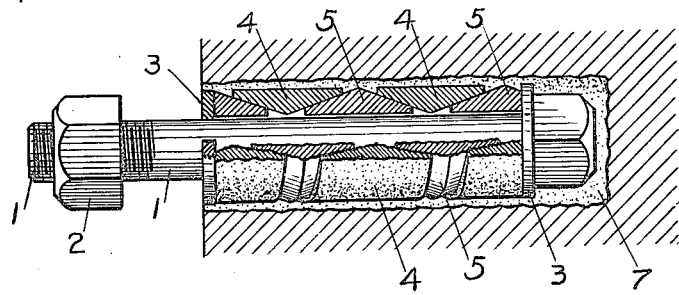
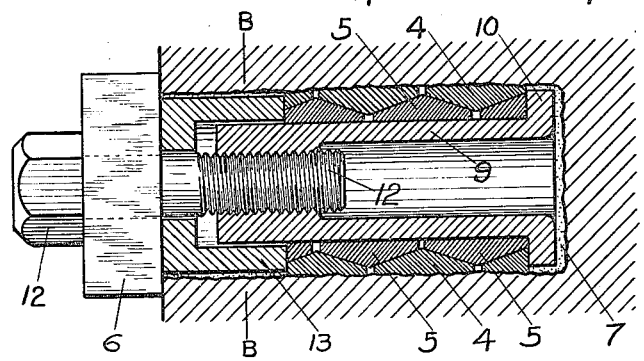
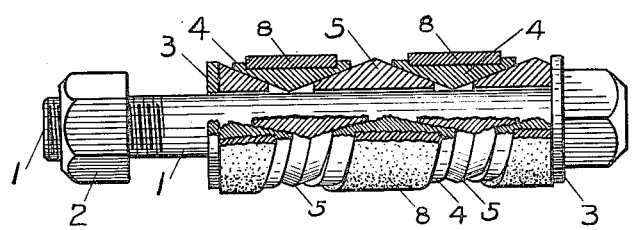
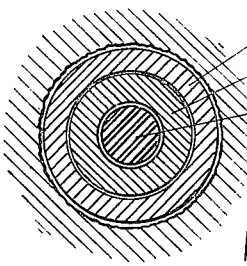
WITNESSES
J. Blumenson
G. Bernard
INVENTOR
Milton T Weston

UNITED STATES PATENT OFFICE.

MILTON T. WESTON, OF NEW YORK, N. Y.

EXPANSION-BOLT.

1,212,298.

Specification of Letters Patent. Patented Jan. 16, 1917.

Application filed February 5, 1913. Serial No. 746,370.

*To all whom it may concern:*

Be it known that I, MILTON T. WESTON, citizen of the United States, and resident of New York, in the county of New York and State of New York, have invented certain new and useful Improvements in Expansion-Bolts, of which the following is a specification.

My invention relates to improvements in expansion bolts wherein the expansion member consists of two convolved helices, or spirals, coöperating in such a manner that when compressed longitudinally the outer helix is expanded circumferentially until it engages the walls of the anchorage hole.

The principal object of my invention is to provide a simple strong and positive expansion bolt which is thoroughly reliable and easy to install.

My invention is fully illustrated in the accompanying drawings in which,—

Figure 1, is a side view showing the expansion member expanded into the anchorage hole which is shown in section. Fig. 2, is a cross-sectional view on a line A—A of Fig. 1. Fig. 3, is a view similar to Fig. 1, but showing the two helices composing the expansion member partly in section and also in normal relation to each other, that is, before being expanded. Fig. 4, is a sectional view showing a modified form of my invention to admit of using stud or tap bolts. The expansion member is shown compressed axially and the outer helix expanded circumferentially and engaging the walls of the anchorage hole. Fig. 5, is a view similar to Fig. 3 and shows a modification in the construction of the outer helix of the expansion member. Fig. 6, is a cross-sectional view on a line B—B of Fig. 4.

Similar numbers refer to similar parts in all the views.

The simplest form of my invention is shown in Figs. 1 and 3 wherein I employ a bolt 1, of ordinary construction fitted with a nut 2. Washers 3, are preferably used on each side of the expansion member 4—5. The "work" or material to be secured in place is represented by the block 6.

The expansion member 4—5, is composed or two co-spirals or helices,—an outer one 4 and an inner one 5. These two helices preferably have inclined or beveled faces which engage each other, said beveled faces being on the inside of the outer helix 4 and on the outside of the inner helix 5. In their normal position as they appear in Fig. 3 the convolutions of the helices 4—5 are comparatively open permitting considerable compression longitudinally, and the inclined or beveled faces of said helices are in contact with each other.

In operation the bolt 1, with washers 3, and expansion member 4—5 thereon, is placed in a suitable anchorage hole 7. The work 6, is placed in position and the nut 2 is set up tight. The action of tightening the nut 2 compresses the expansion member 4—5 longitudinally between the head of the bolt 1 and the work 6, causing a wedging action to take place between the convolutions of the two helices on account of the beveled faces. The result of this wedging action is that the outer helix 4 is positively forced outwardly in an obvious manner inasmuch as the inner helix 5 cannot yield inwardly on account of the body of the bolt 1 passing through it. Continued tightening of the nut 2, therefore, expands the outer helix 4 until it comes into firm contact with the walls of the anchorage hole 7, as clearly illustrated in Figs. 1, 2 and 4. Any additional strain on the bolt 1, either by the tightening of the nut 2 or by an extra weight of the work 6, will only serve to expand the outer helix 4 still more on account of the wedging action of the beveled faces and thus increase its grip in the anchorage hole.

In practice it may be desirable to make the outer helix 4 of a comparatively soft alloy or it may be an advantage to use only an insert 8, of alloy on the outer surface of the outer helix 4, as clearly shown in Fig. 5. On the other hand temporary work may require that the two helices 4—5 be made of a comparatively resilient material so that when the nut and work are removed the expansion member will return to its normal position allowing the bolt to be easily removed.

I do not wish, however, to limit myself to any particular kind of material as it is clearly within the scope of my invention to use the material best suited to any individual case. I also do not wish to limit myself to the particular construction of the expansion member as shown in the drawings for it is obvious that it is quite possible to change the section of the helices considerably and yet obtain the expansion described. I have shown what I believe to be the best and most efficient construction.

There are many instances where it is desirable or necessary to use stud or tap bolts and Fig. 4 shows one method of accomplishing this. The expansion member 4—5, which is the same as shown in the other views, is placed over a sleeve 9 having an annular flange 10 at one end and a hole at the other tapped to receive a stud or the tap bolt 12. A second sleeve or collar 13, fits loosely over the unflanged end of the sleeve 9 and rests against the expansion member 4—5. The sleeve 9 with expansion member 4—5 and collar 13 thereon, is placed in the anchorage hole 7 and a partial expansion of the member 4—5 may be made by driving the collar 13 inwardly with a hammer. Final expansion, however, is preferably made after the work is placed in position and the tap bolt 12 is inserted in the tapped sleeve 9 and firmly tightened as shown.

Having thus described my invention I claim as new:—

1. In an expansion bolt of the type described the combination with a bolt, of an inner spiral member adapted to be compressed in the direction of its axis, with a separate outer co-acting co-spiral member adapted to be expanded circumferentially by the compression of the inner member.

2. In an expansion bolt the combination of an outer spiral expansion member each convolution of which is wedge-shaped on its inner side, of a co-spiral inner member each convolution of which is wedge-shaped on its outer side, and longitudinal compression means to cause circumferential expansion of the outer spiral member by the wedging action of the convolutions of the members.

3. In an expansion bolt, a resilient inner spiral member coöperating with a resilient co-spiral outer member having a soft alloy inlay on its outer surface, means for compressing both members longitudinally to expand the outer member to fill the anchorage hole, and means for releasing the longitudinal compression to allow the expansion members to free themselves from the anchorage hole.

4. In an expansion bolt the combination of a hollow cylindrical sleeve having an annular flange at one end and a tapped hole at the other to receive a stud or tap bolt, of co-spiral expansion members adapted to slip over said sleeve and to be expanded by longitudinal compression, of a collar also adapted to slip over said sleeve and to bear against the expansion members, and means for forcing said collar inwardly, thereby compressing the expansion members longitudinally between the collar and the annular flange.

Signed at New York, in the county of New York and State of New York, this third day of January, A. D. 1913.

MILTON T. WESTON.

Witnesses:
I. BLUMENSON,
G. BERNARD.